United States Patent [19]

Howard

[11] Patent Number: 4,483,108

[45] Date of Patent: Nov. 20, 1984

[54] DRILL BIT FOR GLASS AND CERAMIC STRUCTURES

[76] Inventor: Gerald J. Howard, 11708 Woodley Ave., Granada Hills, Calif. 91344

[21] Appl. No.: 417,127

[22] Filed: Sep. 13, 1982

[51] Int. Cl.[3] .......................... B24B 1/00; B23B 35/00

[52] U.S. Cl. ................................ 51/283 R; 51/206 R; 51/327; 408/1 BD; 408/144; 408/145

[58] Field of Search ........................... 408/144, 145, 1; 51/283 R, 206 R, 209, 325, 326, 327; 125/36; 433/164, 166

[56] References Cited

U.S. PATENT DOCUMENTS

| | | | |
|---|---|---|---|
| 2,555,746 | 6/1951 | Horsky et al. | 408/206 X |
| 2,562,587 | 7/1951 | Swearingen | 51/206 R |
| 2,649,667 | 8/1953 | Cooke | 51/209 R |
| 2,978,846 | 4/1961 | Barron | 408/145 X |
| 2,996,061 | 8/1961 | Miller | 408/145 X |
| 3,142,138 | 7/1964 | Kean et al. | 51/209 R X |
| 3,346,894 | 10/1967 | Lemelson | 408/129 |
| 3,894,673 | 7/1975 | Lowder et al. | 228/122 |

FOREIGN PATENT DOCUMENTS

| | | | |
|---|---|---|---|
| 987112 | 5/1972 | Canada | 51/206 R |
| 806433 | 2/1981 | U.S.S.R. | 125/36 |
| 887210 | 12/1981 | U.S.S.R. | 408/145 |

*Primary Examiner*—William R. Briggs

*Assistant Examiner*—Glenn L. Webb

*Attorney, Agent, or Firm*—K. H. Boswell; Edward D. O'Brian

[57] ABSTRACT

A drill bit suitable for making holes in glass and ceramic structures has an elongated member with a cutting end and a retaining end with an axis passing through its ends. The portion of the member near the retaining end is formed as a shank which is capable of being suitably held and rotated by a chuck or the like. The shank distal to the retaining end terminates in a shoulder which tapers inwardly toward a pilot element which extends axially from the center of the shoulder coaxial with the shank. The pilot element terminates in a cutting surface with the cutting surface forming the forwardmost portion of the cutting end of the member. A cutting grit is permanently affixed at least to the cutting surface on the pilot element, the shoulder and the portion of the shank immediately adjacent to the shoulder. The cutting surface of the pilot element, including the grit affixed thereto, has a smaller cross-sectional dimension than the cross-sectional dimension of the shank immediately adjacent to the shoulder, including the grit affixed thereto. In passing through a material, the grit on the cutting surface of the pilot element cuts a hole of a first dimension and the grit on the shoulder and that portion of the shank immediately adjacent to the shoulder enlarge this hole as they pass therethrough.

4 Claims, 7 Drawing Figures

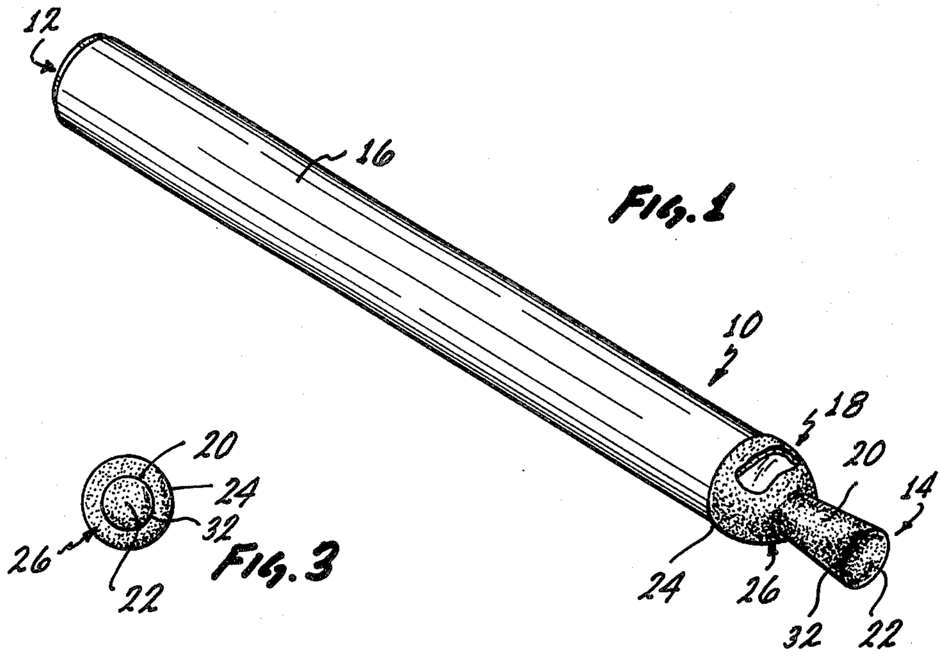
FIG. 1
FIG. 3
FIG. 2
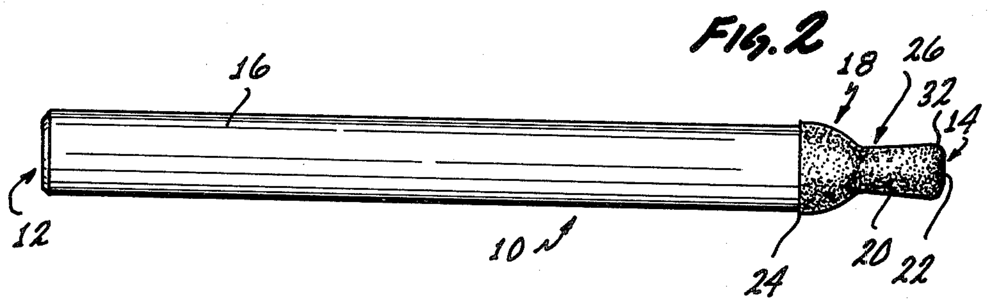
FIG. 4
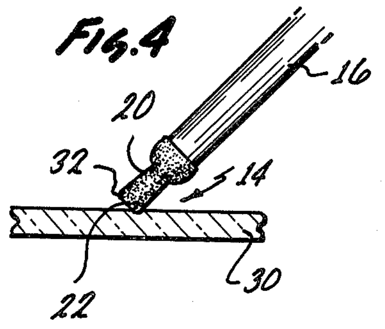
FIG. 5
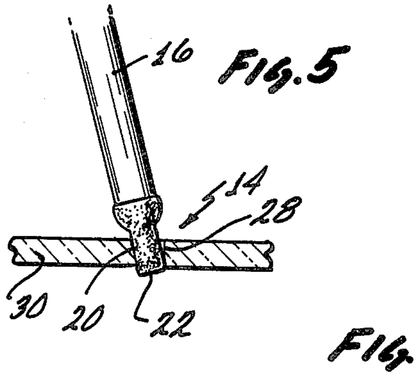
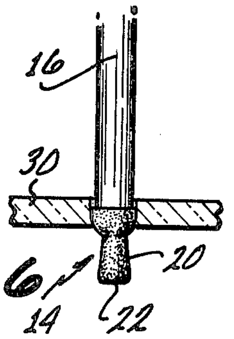
FIG. 6

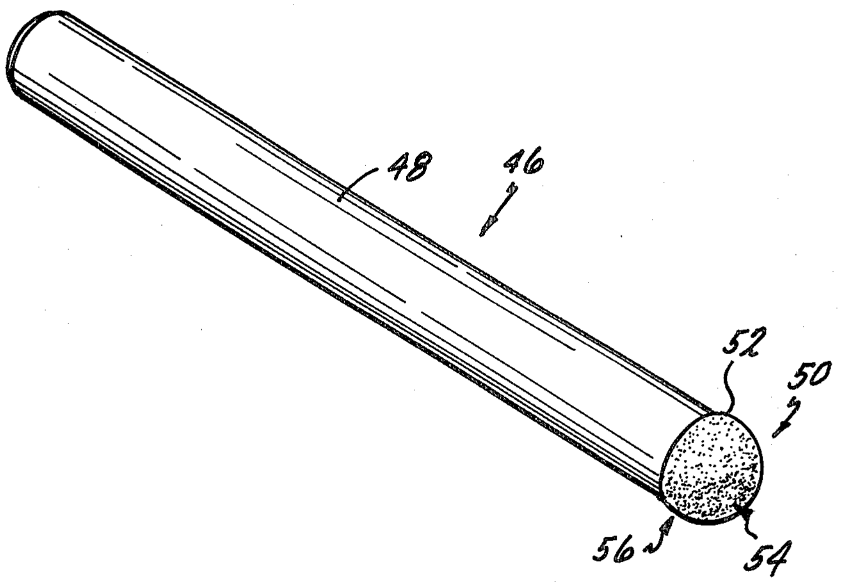
FIG. 7
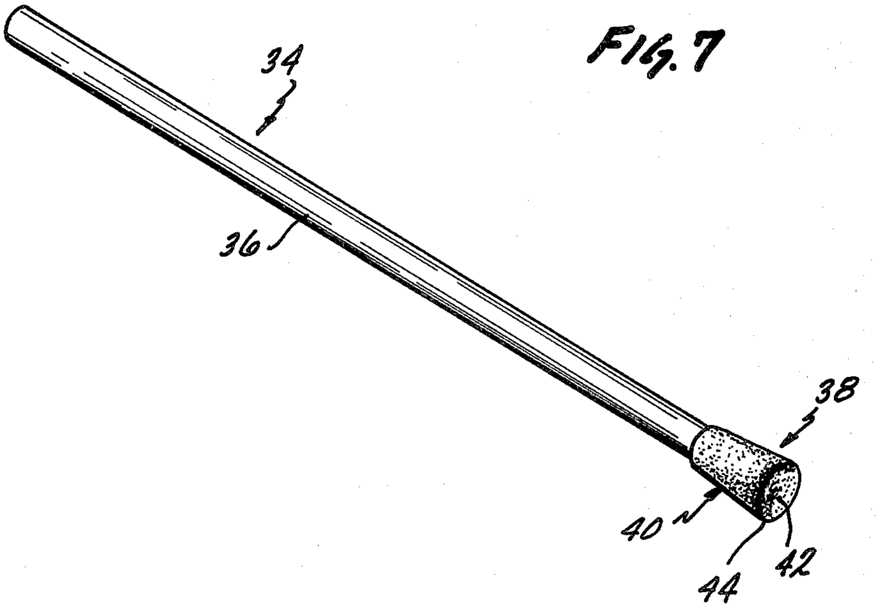

DRILL BIT FOR GLASS AND CERAMIC STRUCTURES

BACKGROUND OF THE INVENTION

This invention is directed to a drill bit structure capable of drilling holes in ceramics, glasses or other hard, brittle materials. More particularly, the drill bit includes a pilot element which forms a hole of a first, small dimension and an enlarging means which subsequently passes through this hole and forms a larger hole of the finished desired dimension.

It is exceedingly difficult to drill holes and the like in hard, brittle materials such as glasses, ceramics, hard cyrstalline structures and the like. Presently, two types of drills are predominantly utilized to form holes in these materials.

The two types of drills commonly utilized are the spear point drill and the core drill. The spear point drill, as its title implies, is shaped much like a spear point. The core drill has a hollow core with a cylindrical cutting edge surrounding the core. With core drills, the use of a coolant or the like is necessary. Neither of the above types of drills, however, are totally satisfactory in their performance and use.

As is evident from considering the rotation of anything, starting at the center of rotation and moving radially from the center of rotation, as an object revolves at a fixed rate of rotation, the velocity of any particular point of that object along the circular path in which the point moves increases as one moves radially away from the center of rotation. Thus, a point located on the periphery of the object is moving along the circular pathway at a greater velocity than a point midway between the center of rotation and the periphery, and at the exact center of rotation the velocity approaches zero.

If one considers a size domain, such as the domain represented by the size of typical cutting grits which might be so located on such a surface, a particular piece of grit located exactly at the center of rotation will, in fact, only rotate, and not move in a circular pathway. A next piece of grit, immediately adjacent but radially displaced from the center of rotation from this first piece of grit, will move in a circular pathway at a very low velocity. As the pieces of grit progress outwardly, the individual pieces of grit start moving at higher and higher velocities in their particular circular pathways.

With a spear point drill having cutting grit on its surfaces, the cutting grit located at the exact center point is in continuous contact with the surface being cut, and because the velocity (in a circular pathway) at the exact center point is low, the cutting grit at and near the center point is involved in a chipping and chiseling type operation. At a greater radial displacement from the center of rotation further up the surface of the spear point, the particles of the cutting grit are moving in their circular pathways at a greater velocity, and as a result of this, these particles cut by high velocity scratching of the surface being cut.

A chipping and chiseling type of cutting can lead to cracks and other stresses in the material being cut. It further leads to "wear" of the tool at and near its point.

Current problems with the currently utilized types of drills for glasses and the like thus include cracks or cataclysmic shattering of the materials being drilled with the spear point drills, and in a further instance, the necessity of using coolants in combination with core drills preclude their use except where bench or other similar type setups are available which can include the use of the coolant.

Because of the above disadvantages of the currently utilized drill bits for cutting glass, ceramics or other hard, brittle materials, it is believed that there exists a need for new and improved drill bits for forming holes and the like in these types of materials. Furthermore, there exists a need for a drill bit which is portable and capable of being utilized in common hand drills, portable power drills and the like without the necessity of complex setups and the presence of coolants and the like.

BRIEF DESCRIPTION OF THE INVENTION

In view of the above, it is a broad object of this invention to provide a drill bit which is suitable for drilling glass, ceramic and the like and does not require excessive coolants, is capable of being manufactured in a variety of sizes and which is capable of being used in hand drills, portable or electric drills or the like. It is a further object of this invention to provide a drill as outlined in the preceding sentence which, because of its engineering and manufacturing principles, can be mass produced, and as such, is capable of being economically available to the consumer, yet is so designed and engineered that it is capable of a long and useful lifetime in use. These and other objects, as will become evident in the remainder of this specification are achieved in a drill bit which comprises: an elongated member having a cutting end and a retaining end and an axis passing through said ends; said member having a shank portion, said retaining end located on said shank porton, said shank portion sized and shaped so as to be capable of being retained and rotated in a tool or machine; said shank portion distal to said retaining end terminating in a shoulder which tapers inwardly from said shank portion; a pilot element extending axially from the center of the shoulder coaxial with said shank, said pilot element terminating in a cutting surface forming the forwardmost portion of said cutting end of said member; a cutting grit affixed to at least said cutting surface of said pilot element, said shoulder and the portion of said shank immediately adjacent to said shoulder; as measured perpendicular to said axis of said member, the maximum cross-sectional dimension of said cutting surface of said pilot element, including said grit affixed thereto, being less than the cross-sectional dimension of said shank immediately adjacent to said shoulder, including said grit affixed thereto, such that in passing through a material said grit on said cutting surface of said pilot element cuts a hole of a first dimension and said grit on said shoulder and said grit on said portion of said shank immediately adjacent to said shoulder enlarges said hole to a greater dimension.

Preferredly, the pilot element will be formed as a surface of revolution centered about the axis of the member with the cutting surface joining the surface of revolution at the maximum cross-sectional dimension of the pilot element. Two such preferred surfaces of revolution fitting the above description include cylindrical shapes and conical frustum shapes. The preferred shape would be that of a conical frustum. The cutting surfaces of each of these shapes would be formed as the base of either the cylinder or the conical frustum, with the other end of the cylinder or the apex of the conical frustum forming the joining point with the remainder of the drill bit.

Preferredly, the cutting surface of the pilot element would either be an essentially flat surface, a concave surface, or an essentially flat surface with curved edges which curve into the walls of the cylindrical or conical frustum walls of the pilot element.

It is preferred that the pilot element be shaped as a conical frustum, with the shank formed as an elongated cylinder and the shoulder formed with a radius of curvature which curves from the cylindrical wall of the shank inwardly and axially to the apex of the conical frustum.

The cutting grit, which is preferredly chosen from the group consisting of diamond grit, silicon carbide grit or tungsten carbide grit, would be preferredly located over the totality of the surface of the pilot element, the totality of the shoulder and the portion of the shank immediately adjacent to the shoulder. Preferredly, this grit would have a mesh size of from about 100 mesh to 120 mesh.

In an alternate embodiment of the invention, in place of having both the shoulder and the pilot element located on a single member, the pilot element could be located on a first member with the shoulder located on a second member. In utilizing such a drill structure as noted in the preceding sentence, a plurality of second members could be formed having different diameters. These second members could each be utilizable with the same pilot element and each of the second members would be sized to have a different outside diameter, such that different size holes could be formed by appropriately using the appropriately sized second member. Additionally, a hole having a larger diameter at one portion and a smaller diameter at a second portion, such as a counter sink hole, could be formed by utilizing two different sized members, the first being passed totally through the hole to produce the smaller diameter hole, and the second then being passed partially through the hole to produce an area having a larger diameter.

In any event, the objects of the invention as outlined above, as well as the additional ability to form holes of different diameters is achieved in a composite drill structure which comprises: a first elongated member having a cutting end and a retaining end with an axis passing through said ends; said first member having a shank portion, said shank portion sized and shaped so as to be capable of being retained and rotated in a tool or machine; said shank portion distal to said retaining end having a pilot element located thereon, said pilot element extending axially from said shank portion and coaxial with said shank portion, said pilot element terminating in a cutting surface, said cutting surface forming the forwardmost portion of said cutting end of said member; a cutting grit affixed to at least said cutting surface of said pilot element; a second elongated member having a cutting end and a retaining end with an axis passing through said ends, said second member having a shank portion, said shank portion sized and shaped so as to be capable of being retained in and rotated in a tool or machine; said shank portion distal to said retaining end terminating in a shoulder which tapers inwardly and joins with itself, forming a continuous surface on the cutting end of said member; a cutting grit affixed to said continuous surface of said second member and the portion of the second member shank immediately adjacent to said shoulder; as measured perpendicular to the axes of each of said first and said second member, the maximum cross-sectional dimension of said cutting surface of said pilot element, including said grit affixed thereto, being less than the cross-sectional dimension of said second member shank immediately adjacent to said shoulder, including said grit affixed thereto, such that if said first member is contacted and rotated against a material in passing through said material, said grit on said cutting surface of said pilot element cuts a hole of a first dimension and if said second member is contacted and rotated against said material with said continuous surface of said second member positioned against said hole formed by said first member said grit on said shoulder and said grit on said portion of said second member shank immediately adjacent to said shoulder enlarge said hole to a greater dimension.

BRIEF DESCRIPTION OF THE DRAWINGS

This invention will be better understood when taken in comjunction with the drawings wherein:

FIG. 1 is an isometric view showing a first embodiment of the invention in oblique view with a portion of the surface cut away to show the structure underneath it;

FIG. 2 is a side elevational view of the embodiment shown in FIG. 1;

FIG. 3 is an end elevational view of the right hand end of FIG. 1;

FIGS. 4, 5 and 6 are side elevational views in section showing the operation of the embodiment of FIG. 1 in drilling a hole through a material; and FIG. 7 is an oblique view showing an alternate embodiment of the invention.

The invention described in this specification and illustrated in the drawings utilizes certain principles and/or concepts as are set forth in the claims appended to this specification. Those skilled in the tooling arts will realize that these principles and/or concepts are capable of being illustrated by a variety of illustrative embodiments. For this reason, this invention is not to be construed as being limited by the exact illustrated embodiment herein but is only to be construed as being limited by the claims.

DETAILED DESCRIPTION OF THE INVENTION

In FIG. 1, the drill bit 10, exemplifying the first embodiment of this invention, is shown. The drill bit 10 is formed as an elongated member having a retaining end 12 and a cutting end 14. The cutting end 14 constitutes the working end of the drill bit 10.

The drill bit 10 is formed of an elongated member having several component parts. Included would be a shank 16 which is sized and shaped such that the drill bit 10 can be inserted into an appropriate chuck, collet or the like of a tool or machine which is designed for rotation. As such, the retaining end 12 is inserted into the appropriate chuck, collet or the like and the chuck, collet or the like is secured around the shank 16 to fixedly hold the drill bit 10 in position for rotation and utilization of the same.

Progressing along the shank from the retaining end 12 to the cutting end 14, there is a shoulder 18. The shoulder 18 gently curves inwardly and axially toward the cutting end 14.

Normally, the shank 16 would be formed as a long cylindrical element and as such, the shoulder 18 would mimic the circular shape of the shank 16. It is preferred that the shoulder 18 be formed as a gentle curve having a radius of curvature such that the shape of the shoulder 18 is either that of a circle or an elipse.

Projecting axially from the center of the shoulder 18 is a pilot element 20. The pilot element 20 terminates in a cutting surface 22. The cutting surface 22 forms the forwardmost portion of the cutting end 14 of the drill bit 10.

The pilot element 20 is preferredly shaped either as a cylindrical element or as a conical frustum. In either of these shapes, the cutting surface 22 would represent the largest cross-sectional dimension of the pilot element. Thus, if the pilot element 20 is formed as a cylinder, the dimension across the cutting surface would be the same as the dimension across the remainder of the cylinder (measured of course perpendicular to the longitudinal axis of the drill bit 10) and if the pilot element 20 is formed as a conical frustum, the cutting surface 22 would represent the greatest dimension of the pilot element 20 with the dimension across the diameter of the pilot element at any particular point as one proceeds toward the shoulder 18 being less than the dimension of the diameter of the outside edge of the cutting surface 22. In any event, the pilot element 20 extends outwardly from the shoulder 18 forming an axial projection from the shoulder 18.

The cutting surface 22, the remainder of the pilot element 20, the shoulder 18 and the area 24 of the shank 16 immediately adjacent to the shoulder 18 are all covered with a suitable cutting grit 26. The coverage of the cutting grit is evident from the figures and as seen in the cutaway portion of FIG. 1, the cutting grit 26 is formed as a thin layer over the areas just mentioned. The cutting grit 26 forms the cutting edges for the drill bit 10 in actual operation in cutting a glass, ceramic or other hard, brittle material.

The diameter of the area 24 of the shank 16 immediately adjacent to the shoulder 18 with the cutting grit 26 attached thereto, forms the maximum diameter of the drill bit 10, as illustrated in FIG. 1. This diameter would be the diameter of the final sized hole which would be produced in utilization of the drill bit 10. The diameter of all portions of the cutting element 20, including the cutting surface 22 would be less than the diameter across the area 24. Thus, in passing into a material, the pilot element 20 would form a hole of a first diameter and when the hole thus formed, such as the hole 28 seen in FIG. 5, was contacted by the shoulder 18, this hole would be enlarged until the area 24 of the shank 16 passed through this hole. The final hole produced by the area 24, including the thickness of the cutting grit 26 located thereon, would thus be the finished hole produced by the drill bit 10.

Preferredly, the cutting grit 26 would be formed of either diamond grits, silicon carbide grits or tungsten carbide grits. The preferred material would be diamond. The preference for diamond, of course, relates to its hardness over the other two materials mentioned. In any event, a suitable cutting grit would be chosen for affixing to the drill bit 10.

For utilization in cutting glass, the preferred grit size would be of a mesh of from about 60 mesh to about 220 mesh, preferredly 100–120 mesh. Suitable grit of either diamond, silicon carbide or tungsten carbide are available in this mesh range.

The drill bit 10, excluding the cutting grit 26 would be preferredly formed of a suitable metallic blank such as a cold rolled steel or other material. This blank would be preshaped into the form including the shank 16, the shoulder 18 and the pilot element 20, and after being so preformed, would be subjected to a process to adhere the cutting grit 26 thereon.

Preferredly, the process utilized for adhering the cutting grit 26 on to the blank utilized for the drill bit 10 would be a process such as those processes outlined in the U.S. Pat. Nos. 3,894,673 and 4,018,576. It is understood that these processes incorporate the use of a flux which is heated to approximately 2100 degrees Farenheit, which essentially "brazes" the cutting grit onto the blank. A diamond grit of approximately 100 mesh has been suitably adhered to a blank utilizing the technology as outlined in the above identified patents by a company identified as Abrasive Technology, Columbus, Ohio.

While the process identified in the preceding paragraph would be the preferred process for adhering suitable cutting grit to a blank to form the drill bit 10, other materials might also be used. For instance, an epoxy glue having a high melting point might find utilization for adhering certain cutting grits wherein the drill bit 10 so produced could be utilized in a cutting operation in the presence of a cooling fluid or the like wherein the cooling fluid would sufficiently withdraw the cutting heat generated such that the epoxy or other material utilized to adhere the cutting grit 26 to the drill bit 10 would not be thermally degraded.

As noted in the background of this specification, cutting grit located at the exact center of rotation of a cutting tool has a lower velocity than grit radially located further from the center of rotation. Additionally, because of the increased size as one moves radially outward from the center of rotation, for every rotation of the drilling tool, more individual particles of cutting grit can contact an area further displaced from the center of rotation than closer to the center of rotation. Because of this, certain consideration can be given to the shape of the cutting surface 22.

Preferredly, the shape of the cutting surface 22 would be either flat or concave. These two shapes can be augmented somewhat by rounding of the point of attachment of the cutting surface 22 to the pilot element 20, as is illustrated in the figures. While a convex shape for the cutting surface 22 is not detrimental, one of the other of the shapes as listed is preferred. The reason for this is as follows.

FIGS. 4, 5 and 6 illustrate the use of the drill bit 10 in forming a hole through a material 30 which would be a material of the class of a glass, ceramic or other suitably hard material which tends to shatter or crack. As illustrated in FIG. 4, to initially start penetration of the drill bit 10 through the material 30, the drill bit 10 is contacted against the material 30 with the drill bit 10 at about a 45° angle to the surface of the material 30. This contacts the outside edge 32 of the cutting surface 22 against the material 30. As the drill bit 10 is suitably rotated against the material 30, the totality of the cutting grit 26 located along this outside edge 32 contacts and scratches or abrades the material 30. This leads to prolonged life of the drill bit 10 in that there is physically a greater number of particles located along the outside edge 32 than there is at the center of rotation on the cutting surface 22. Further, the speed of movement of these particles along the outside edge 32 is at a higher velocity than the speed of movement of the particles closer to the center of rotation. Because of the higher velocity of the movement of the particles, they tend to simply scratch against the surface of the material 30 with each individual particle producing a small scratch, which, in sum, produce a cutting action.

By initially contacting the material 30 with this high velocity multi-particle area located along the outside edge 32, the mulitplicity of small scratches are produced as opposed to chipping or chunking of material which would be achieved if only a slow-moving, smaller number of particles near the center of rotation were utilized.

After the surface of the material 30 is initially abraded, and the pilot element 20 has initially started to penetrate the material 30, the angle of the drill bit 10 is changed such that the axis of the drill bit 10 is approximately 15° displaced from a line which is normal or perpendicular to the top of surface of the material 30. With the use of a frustoconical shape pilot element 20 having about a 15° wall inclination, this places one of the side surfaces of the pilot element 20, such as right side surface seen in FIG. 5, at almost a vertical inclination. Even though the drill bit 10 is not inclined as steeply to the material 30 as it was in the initial penetration shown in FIG. 4, in FIG. 5 it is still the outside edge 32 of the cutting surface 22 which forms the leading-most cutting surface on the drill bit 10.

As the pilot element 22 passes through the material 30 as seen in FIG. 6, the pilot element 20 produces a hole having a diameter equal to the diameter across its largest dimension, i.e., the diameter across the cutting surface 22. The shoulder 18 then contacts this pilot hole. As the shoulder 18 engages the material 30, the pilot hole is enlarged and increases until the shoulder 18 is completely within the material 30 and the maximum radius of the drill bit 10 along area 24 of the shank immediately adjacent to the shoulder 18 determines the final size of the hole produced. In summary then, the pilot element 20 first penetrates the material 30, making a pilot hole. The shoulder 18 and the area 24 then follow the pilot element 20 onto the pilot hole and enlarge the pilot hole to its final dimension.

With the drill bit 10, both the processes of first forming the pilot hole and then enlarging the pilot hole are accomplished utilizing a single implement. These same processes could be accomplished utilizing two separate implements. In FIG. 7, two such seperate implements are illustrated. Thus, in FIG. 7, a first drilling member 34 is shown, which includes a shank 36 having a pilot element 38 projecting axially from the shank. The pilot element 38 includes a suitable cutting grit 40 located on its surface. The cutting grit 40 need only be located on the cutting surface 42 of the pilot element 38. However, as shown in FIG. 7, it can be located on the totality of the pilot element 38 to the point where it joins the shank 36.

The cutting surface 42 shown in FIG. 7 for the drilling member 34 is concave in shape, thus forming a very sharp cutting edge 44 where the surface 42 joins the remainder of the pilot element 38.

The second element shown in FIG. 7 is the enlarging member 46. The member 46 includes a shank 48, which terminates at the cutting end 50 into a shoulder 52. The shoulder 52 is rounded and comes back to join itself to form a smooth, continuous hemispherical surface. Located on the surface of the shoulder 52 would be suitable cutting grit 54.

Utilization of the embodiment as depicted in FIG. 7 is as follows. First, a pilot hole is formed with the pilot element 34 in the same manner as that achieved with the drill bit 10 for initial preparation of the pilot hole. As soon as the pilot hole is formed, the member 34 is withdrawn, and the hole is then enlarged to its final size utilizing the enlarging member 46. As with the drill bit 10, the final diameter of the hole so produced is determined by the diameter of the area 56 of the shank 48 right next to the shoulder 52, including the cutting grit thereon.

In either of the embodiments depicted in either FIGS. 1 through 6 or in FIG. 7, the shoulders 18 or 52 can be formed as curved surfaces of rotation or they can be formed as straight surfaces of rotation. That is, in place of having a somewhat spherical surface for the shoulder 52 and partially spherical surface for the shoulder 18, conical surfaces could also be utilized. Curved surfaces are preferred, however, in that they form a smoother transition during cutting when moving from the shoulders to the areas of the shank immediately adjacent to the shoulders.

It is evident from viewing FIG. 7 that a plurality of different enlarging members 46 could be utilized with the same pilot member 34. Thus, the pilot member 34 could be utilized to form a pilot hole of a particular dimension and, depending on the size of the final hole desired, appropriate enlarging members 46 having the appropriate diameter would be chosen to enlarge this hole to the final size. It is considered that the system shown in FIG. 7 would be directed to more industrialized processes done on a very repetitive basis, whereas the system depicted in FIGS. 1 through 6 would be more suitable for infrequent users of the teachings of this invention. With the drill bit 10, the home hobbyist or the like can easily and conveniently form holes in glass and the like in common size ranges up to and including, but not limited to, one half inch in size.

The drill bit 10, or the members 34 and 46, illustrated in FIG. 7 can be utilized in a variety of different machines capable of rotating them. They are utilizable in a hand-held, hand-rotated drill, as well as in mechanized machinery. Preferredly, the drill bit 10 and the members 34 and 46 would be utilized in a hand-held power drill which will rotate the drill bit 10 or the members 34 or 46, allowing the operator more freedom during the drilling operation. In any event, since the final diameter of the hole so produced is created by a large number of particles moving at a rapid rate of rotation which are located at either the area 24 of the drill bit 10 or the area 56 of the enlarging member 46, a smooth, clean hole is formed in the glass, ceramic or other similar material.

As an alternative process for adhering the cutting grit 26 on to a blank, a process utilizing electrolytic deposition of a metallic "glue" for the grit could be used. In utilizing such a process, the grit would be suspended in a suitable solution containing an appropriate metal ion, such as nickel ion in solution, therein. Upon plating of the nickel on to the blank, the suspended grit would get entrapped in the plated metal on the surface of the blank. The above noted process is typically referred to as "diamond plating" in the industry to which this subject matter belongs.

While the use of coolants is not absolutely mandatory during usage of the drill bit 10, or the alternate drill bits 34 and 46, the addition of a milliliter or so of water facilitates extending the life time of the drill bits. This is contrasted against the necessity of continuously supplying coolant during the use of core drills, and the necessity of using special coolants such as kerosene and the like with the spear point drills.

I claim:

1. A drill bit which comprises an elongated member having a cutting end and a retaining end, and an axis passing through said ends;

said member having a shank portion, said retaining end located on said shank portion, said shank portion sized and shaped so as to be capable of being retained and rotated in a tool or machine;

said shank portion distal to said retaining end terminating in a shoulder which tapers in a radius of curvature inwardly from said shank portion;

a pilot element extending axially from the center of said shoulder coaxial with said shank, said pilot element terminating in a cutting surface, said cutting surface forming the forwardmost portion of said cutting end of said member, said pilot element shaped as a conical frustum, said cutting surface is an essentially flat surface with curved edges;

a cutting grit affixed to and covering said pilot element, said shoulder and the portion of said shank immediately adjacent to said shoulder;

as measured perpendicular to said axis of said member, the maximum cross-sectional dimension of said cutting surface of said pilot element, including said grit affixed thereto, being the maximum cross-section dimension of said pilot element as measured perpendicular to said axis of said member and being less than the cross-sectional dimension of said shank immediately adjacent to said shoulder, including said grit affixed thereto such that in passing through a material said grit on said cutting surface of said pilot element cuts a hole of a first dimension and said grit on said shoulder and said grit on said portion of said shank immediately adjacent to said shoulder enlarges said hole to a greater dimension.

2. The drill bit of claim 1 wherein:

said cutting grit is chosen from the group consisting of diamond grit, silicon carbide grit and tungsten carbide grit.

3. The drill bit of claim 2 wherein:

said grit has a mesh size of from about 100 mesh to about 120 mesh; and said grit is affixed to said member by heating said member, said grit and a flux at a temperature sufficient to bond said grit to said member with said flux.

4. A process of forming a hole in a glass or ceramic structure using a bit having:

(a) an elongated member having a cutting end and a retaining end, and an axis passing through said ends;

(b) said member having a shank portion, said retaining end located on said shank portion, said shank portion sized and shaped so as to be capable of being retained and rotated in a tool or machine;

(c) said shank portion distal to said retaining end terminating in a shoulder which tapers in a radius of curvature inwardly from said shank portion;

(d) a pilot element extending axially from the center of said shoulder coaxial with said shank, said pilot element terminating in a cutting surface, said cutting surface forming the forwardmost portion of said cutting end of said member, said pilot element shaped as one of a cylinder or a conical frustum, said cutting surface is one of an essentially flat surface or an essentially flat surface with curved edges;

(e) a cutting grit affixed to and covering said pilot element, said shoulder and the portion of said shank immediately adjacent to said shoulder;

(f) as measured perpendicular to said axis of said member, the maximum cross-sectional dimension of said cutting surface of said pilot element, including said grit affixed thereto, being the maximum cross-section dimension of said pilot element as measured perpendicular to said axis of said member and being less than the cross-sectional dimension of said shank immediately adjacent to said shoulder, including said grit affixed thereto such that in passing through a material said grit on said cutting surface of said pilot element cuts a hole of a first dimension and said grit on said shoulder and said grit on said portion of said shank immediately adjacent to said shoulder enlarges said hole to a greater dimension;

said process comprising: locating said bit in a means for rotating said bit;

tilting the axis of said bit which passes through said ends at an angle to a work surface on said structure such that only the outside periphery of said cutting surface on said pilot element contacts said work surface;

rotating said bit and while said bit is rotating contacting said cutting grit located on the outside periphery of said cutting surface of said pilot element against said work surface to form a pilot hole in said structure;

orienting said axis of said bit which passes through said ends of said bit toward a line perpendicular to said work surface and further rotating said bit so as to contact said rounded shoulder in said bit against said work surface to complete said hole in said structure.

* * * * *